June 3, 1941.　　　W. EHRENBERG　　　2,244,245
CATHODE RAY TUBE
Filed July 14, 1938

INVENTOR
WERNER EHRENBERG
BY
ATTORNEYS

Patented June 3, 1941

2,244,245

UNITED STATES PATENT OFFICE 2,244,245

CATHODE RAY TUBE

Werner Ehrenberg, Hayes, England, assignor to Electric & Musical Industries Limited, Hayes, Middlesex, England, a company of Great Britain Application July 14, 1938, Serial No. 219,116
In Great Britain July 30, 1937

3 Claims. (Cl. 250—164)

The present invention relates to optical image producing arrangements, and more especially to optical image producing arrangements of the type in which an optical image is produced on the screen of a cathode ray tube which screen is usually formed on one end thereof, as for example in a television receiver.

In such an arrangement some of the light emitted from the screen is reflected back from the surroundings, and especially from the surrounding glass wall of the tube, and illuminates the whole screen, thus diminishing the contrast available.

Several methods have been employed to diminish this contrast reducing effect. For example, the bulb of the cathode ray tube may be formed of untreated transparent material (such as glass) and the whole tube inserted into a blackened box. With this arrangement about 10% of the light falling on the glass envelope is reflected back from the inner and outer glass surfaces of the tube walls and some of the reflected light eventually reaches the screen. Also, an appreciable portion, say from 5% to 20% of the light will be scattered back from the enclosing container. Alternatively, the inner glass wall of the cathode ray tube may be covered by a black material, and in this way the reflection from the glass walls of the tube is eliminated. However, with this arrangement an appreciable amount of light is scattered back from the more or less matt surface of the "black" covering directly on to the screen.

The object of the present invention is to reduce the amount of undesired light thrown on to the screen in optical image producing arrangements.

The invention will now be explained with reference to the drawing wherein like reference characters represent like parts and wherein.

According to the present invention an optical image producing arrangement of the kind in which an optical image is produced on a fluorescent or luminescent screen 10 enclosed in a housing or tube 12 having transparent walls is provided, and in which for the purpose of reducing the amount of scattered or diffused light within the housing, all or most of the parts of the walls of the housing except those parts through which the screen is viewed, are covered on their outside by a light absorbing coating 14, the coating having the same or nearly the same refractive index as the material of which the transparent walls are composed.

In carrying the invention into practice preferably the material 14 used for covering the transparent walls of the housing or tube 12 is a black varnish which may be applied simply by brushing or spraying, the varnish having the same or nearly the same refractive index as the material of which the transparent walls are composed. This latter material will, of course, usually be glass.

In carrying the invention into effect, with glass tubes, compounds containing black cellulose or Bakelite lacquers have been found to give satisfactory results. The invention is, however, not limited to the use of the materials mentioned, the suitability of a particular material being readily ascertainable by test.

Figure 1:
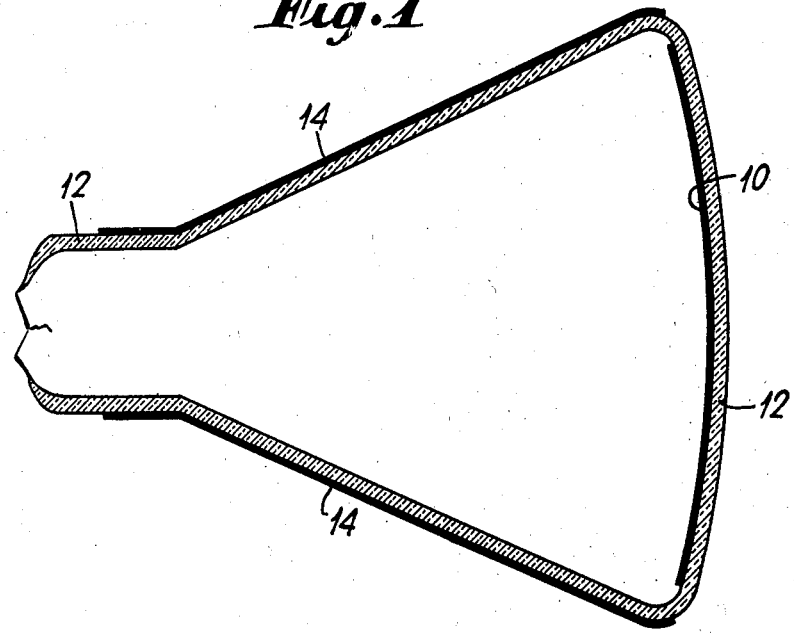
Figure 1 shows a cathode ray tube incorporating the present invention.
Figure 2:
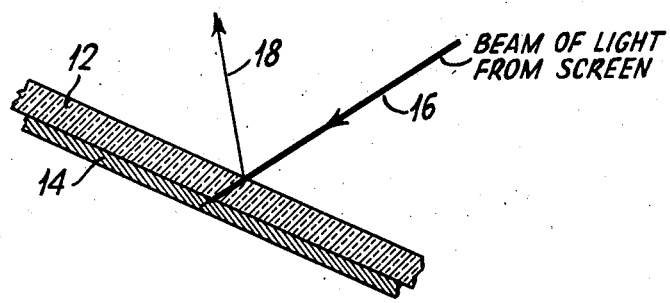
Figure 2 shows an enlargement of a portion of the tube.

The effect of the layer of black varnish or similar coating 14, provided according to the invention, will be readily understood by considering the effect of the coated glass surface in respect of a beam of light 16 (see Figure 2) incident thereon. The beam of light will first fall on the inner surface of the glass or other transparent medium of which the wall is composed, and due to the difference between the refractive index of the vacuum in which the light has been traveling prior to its incidence on the glass and of the glass itself, part of the light, usually about 5%, will be reflected at this inner surface as shown at 18 in Figure 2.

The unreflected light will pass through the glass and will fall on the outer surface of the glass, but as the varnish or outer covering applied to the glass has substantially the same refractive index as the glass, no reflection or only a negligible amount of reflection will take place at this surface, and the light will pass into the varnish wherein it will be progressively and rapidly absorbed.

Thus with an arrangement according to the invention, the light actually reaching the screen is practically all reflected light, and there is substantially no scattering of light from the transparent walls of the housing. However, the reflected light cannot in general reach the screen directly after only one reflection, and at each reflection the amount of light retained within the tube is only 5% of the incident light, so that the illumination produced on the screen by the reflected light is so very slight as to be practically negligible. It will thus be appreciated that the most important advantage achieved by the arrangement according to the invention, is the elimination of scattered light from within a tube in which the optical image is to be produced. It is also to be seen that the reflected light itself is approximately half what it would be in a tube in which reflection takes place at the inner and outer surfaces of the glass walls of the tube, in that with the arrangement according to the invention, reflection at the outer surface of the tube is substantially eliminated. Another advantage of the invention is that the application of black varnish on the outside of a cathode ray tube does not introduce any complication in the evacuation of the tube or in the assembly of electrodes within the tube. It is thus to be seen that the invention represents an important advance over either of the methods of treating image producing arrangements such as cathode ray tubes, described above.

I claim:

1. A cathode ray tube comprising a substantially transparent glass envelope, a fluorescent screen on the inside surface of a portion of the envelope, and an opaque coating of material on substantially the entire outside surface of the envelope except for the portion which carries the screen, the index of refraction of the coating of material being substantially identical with the index of refraction of the glass from which the envelope of the tube is made, whereby internal reflection of light from the screen is substantially entirely eliminated.

2. A cathode ray tube wherein internal light reflections are substantially eliminated comprising a transparent glass envelope having an end wall and a flared body portion, a fluorescent screen on the inside surface of the end wall, an opaque coating of material on substantially only the outside flared surface of the body portion of the envelope, the index of refraction of the coating of material corresponding to the index of refraction of the glass envelope, whereby light reflections on the inside of the envelope of the tube are substantially eliminated.

3. A cathode ray tube comprising a substantially transparent envelope, a screen on the inside surface of a portion of the envelope adapted to produce light when bombarded by a cathode ray beam, and an opaque coating of material on substantially the entire outside surface of the envelope except for the portion which carries the screen, the index of refraction of the coating of material corresponding to the index of refraction of the envelope, whereby light reflections on the inside of the envelope of the tube are substantially entirely eliminated.

WERNER EHRENBERG.